Nov. 10, 1953   E. L. ALLEN   2,658,781
DOOR CONTROL MECHANISM
Filed Jan. 12, 1948   8 Sheets-Sheet 1

INVENTOR.
EDWIN L. ALLEN
BY
Bosworth & Sessions
ATTORNEYS

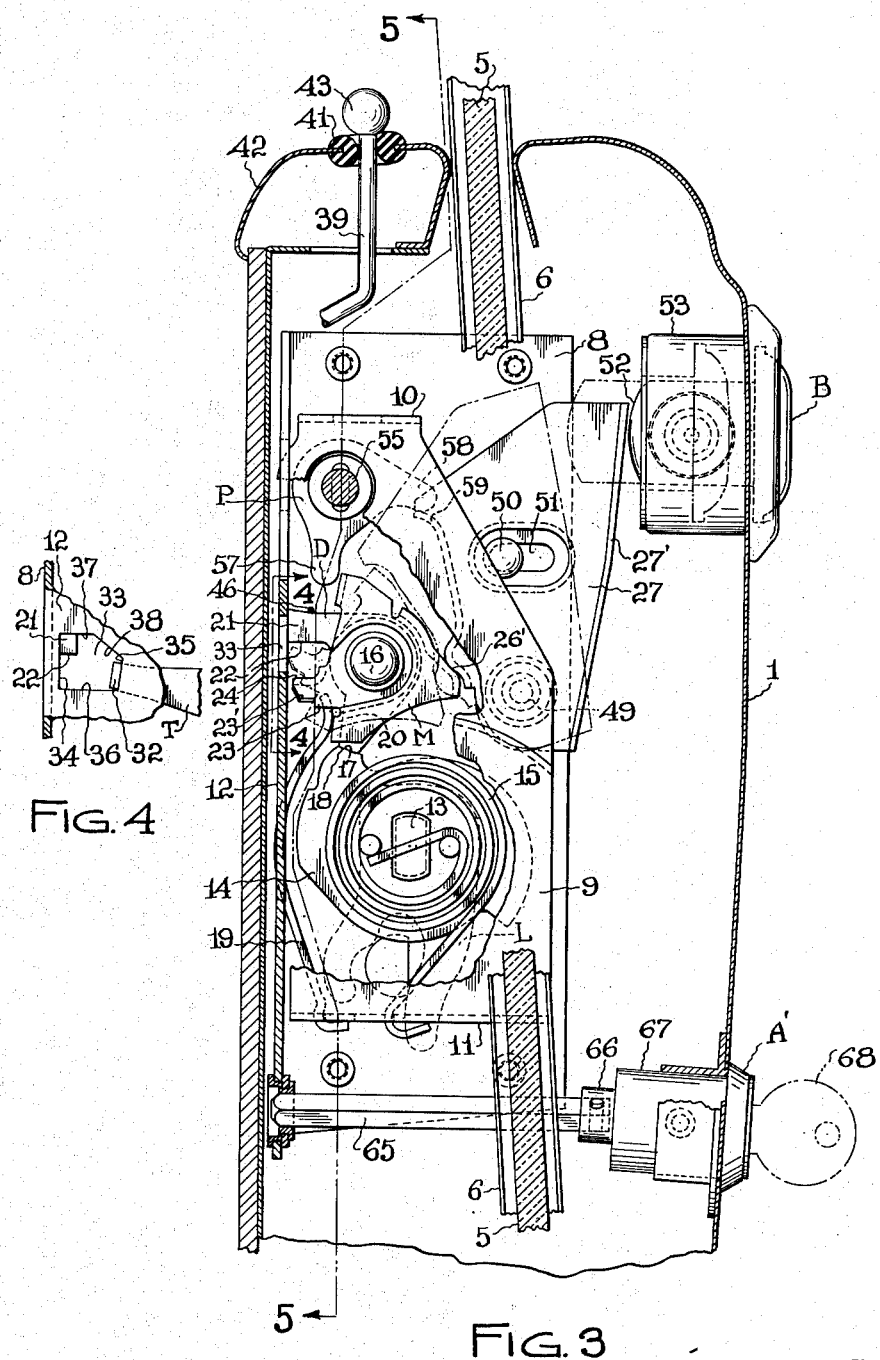

Nov. 10, 1953

E. L. ALLEN 2,658,781

DOOR CONTROL MECHANISM

Filed Jan. 12, 1948

INVENTOR.
EDWIN L. ALLEN
BY
Bosworth & Sessions
ATTORNEYS

Nov. 10, 1953 E. L. ALLEN 2,658,781
DOOR CONTROL MECHANISM
Filed Jan. 12, 1948 8 Sheets-Sheet 4
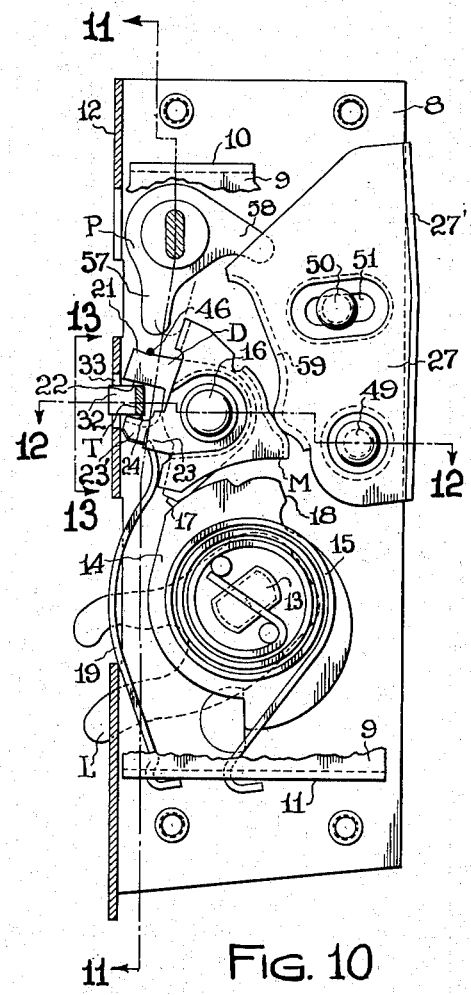
FIG. 10
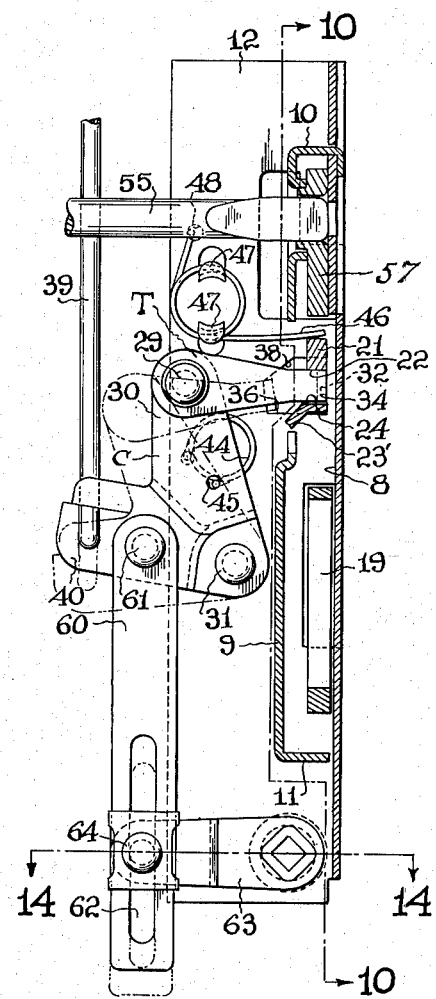
FIG. 11
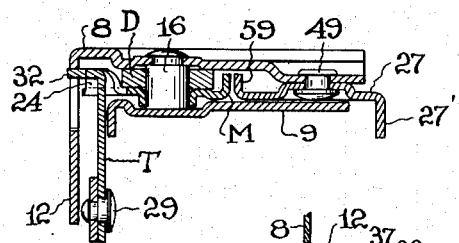
FIG. 12
FIG. 14
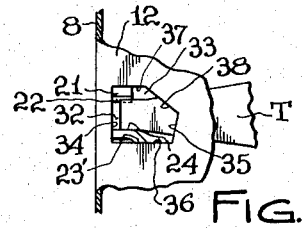
FIG. 13
INVENTOR.
EDWIN L. ALLEN
BY
Bosunth & Sessions
ATTORNEYS.

Nov. 10, 1953 — E. L. ALLEN — 2,658,781
DOOR CONTROL MECHANISM
Filed Jan. 12, 1948 — 8 Sheets-Sheet 5

INVENTOR.
EDWIN L. ALLEN
BY
Bosworth & Sessions
ATTORNEYS.

Nov. 10, 1953  E. L. ALLEN  2,658,781
DOOR CONTROL MECHANISM
Filed Jan. 12, 1948  8 Sheets-Sheet 6
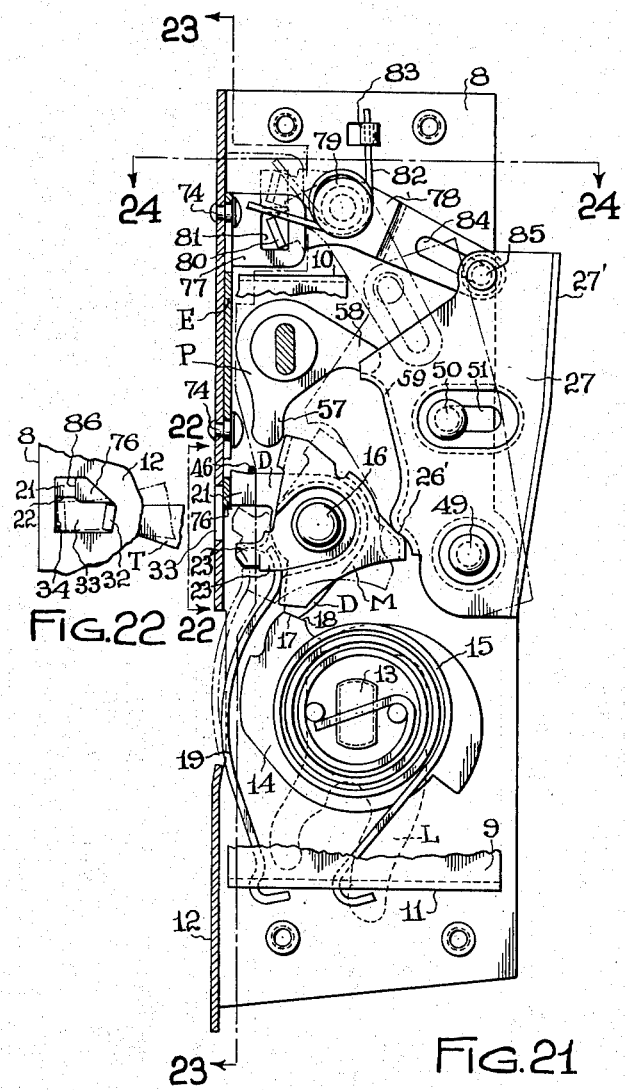
Fig. 22
Fig. 21
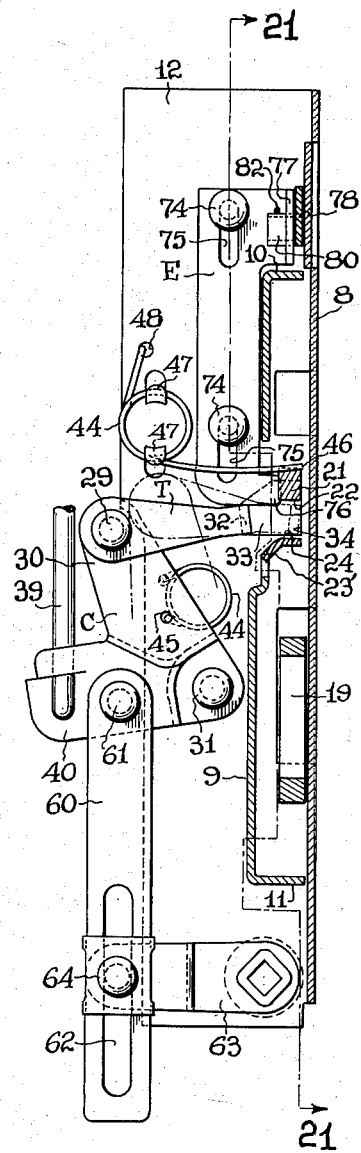
Fig. 23
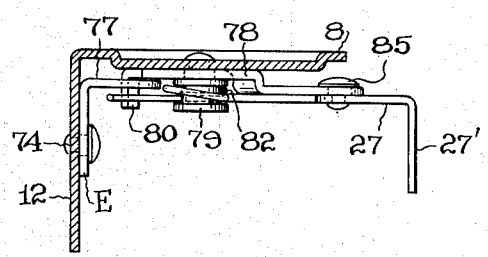
Fig. 24
INVENTOR.
EDWIN L. ALLEN
BY
Bosworth & Sessions
ATTORNEYS.

INVENTOR.
EDWIN L. ALLEN
BY
Bosworth & Sessions
ATTORNEYS

Nov. 10, 1953     E. L. ALLEN     2,658,781
DOOR CONTROL MECHANISM
Filed Jan. 12, 1948     8 Sheets-Sheet 8
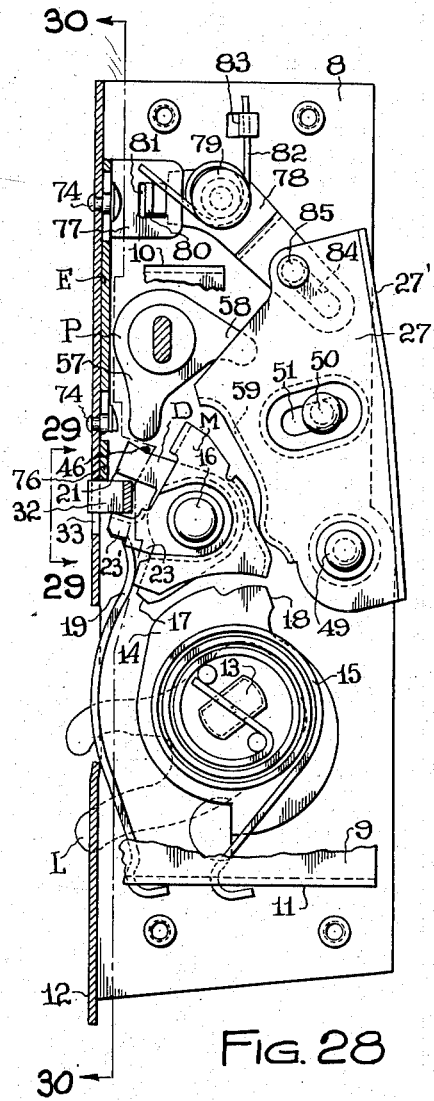
FIG. 28
FIG. 29
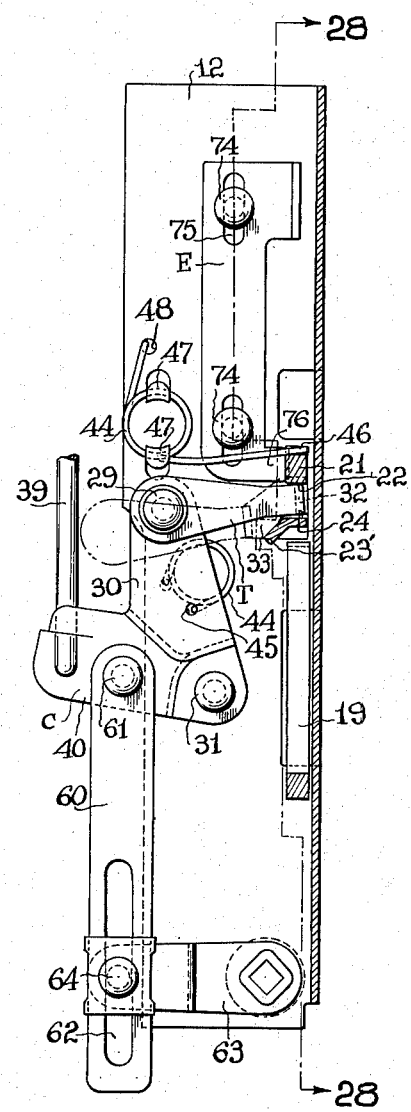
FIG. 30
INVENTOR.
EDWIN L. ALLEN
BY
Bosworth & Sessions
ATTORNEYS Patented Nov. 10, 1953

2,658,781

UNITED STATES PATENT OFFICE 2,658,781

DOOR CONTROL MECHANISM

Edwin L. Allen, Cleveland Heights, Ohio, assignor, by mesne assignments, to Rudolph I. Schonitzer, Cleveland, Ohio Application January 12, 1948, Serial No. 1,814

13 Claims. (Cl. 292—216)

This invention relates to door control mechanisms and more particularly to means for locking door control mechanisms to prevent unauthorized opening of the door with which the mechanism is associated.

Although the present invention is illustrated and described herein in association with the door of an automotive vehicle it will be understood that my invention is applicable to many different types of closure members which require latching and locking apparatus.

Door control mechanisms of the type illustrated herein may be broadly described as having coacting elements associated with the door and door frame structures whereby the door may be latched and held in closed position or released from closed position to permit opening thereof, and including detent means whereby one of the coacting elements, which may be termed the latch member, is releasably retained in its operative or door latched position when the door is closed. When the detent of this type of mechanism is moved by suitable means, such as a push button or handle device and associated intermediate operating members, to release the latch member and permit opening of the door, the latch member is moved into an operated or door unlatched position, which is different from its above-mentioned operative or door latched position, concurrently with opening movement of the door and remains in this operated position until the door is again closed. Although a push button arrangement has been illustrated and described herein as the member which is directly manually actuated by the operator or user it will be understood that various arrangements of handles, levers, etc. may be employed instead of a push button proper and accordingly, where the term "push button" is used herein it is intended to include all types of controlling or operating devices such as handles, levers, etc. as well as push buttons proper.

Various means have been proposed for effecting locking of door control mechanisms. In the Rudolph I. Schonitzer United States Patent No. 2,094,413 dated September 28, 1937, a door control mechanism is disclosed wherein means are provided for locking same by blocking certain parts of the latch mechanism against movement from door latched position to door unlatched position. My copending United States patent application Serial No. 746,521, filed May 7, 1947, also discloses and claims a latch mechanism having certain improvements in locking means for preventing movement of the latch unit when the door is closed and latched thus preventing unauthorized entry. Some features of the locking mechanism of the present application are described and claimed in my said copending application Serial No. 746,521 and accordingly cross-reference is hereby made thereto.

In the devices specifically illustrated in the said Schonitzer patent and in my above identified copending application Serial No. 746,521 the restraining or locking means for blocking the mechanism to prevent unauthorized operation thereof effects its locking action by preventing moving of the detent from latch holding to latch released position. Locking arrangements of this general type provide effective and satisfactory locking action but, as the detent in such devices is usually controlled by a push button disposed on the outside of the door (and also a second push button on the inner side of the door in most instances), when the mechanism is locked to prevent movement of the detent and latch member, movement of the push button from door latched to door released position is also prevented. In some cases such an arrangement is considered undesirable because, in an effort to open the locked door by force on the push button, excessive force may be applied thereto with resulting damage to the mechanism.

To avoid the possibility of such damage it has been proposed to provide means for idling the outside and/or inside push buttons in such a manner that the buttons may have substantially the same movement when force is exerted thereon by the operator, regardless whether the latch mechanism is locked or unlocked. Such an arrangement is described and claimed in my copending United States application Serial No. 713,220, filed November 30, 1946, and other means for idling the outside push button are described and claimed in the Edwin L. Allen, Angelo R. de Vito and Harold B. Muster United States patent application Serial No. 723,330, filed January 21, 1947, now Patent No. 2,587,583. The present application relates to improvements in door control mechanisms of the general class described and claimed in said copending applications and cross-reference is accordingly hereby made thereto.

It is among the objects of the present invention to provide an improved door control mechanism provided with means for permitting idling movement of the push button or the like when the door is locked against unauthorized opening, and which is particularly suited for use with doors of automotive vehicles.

Another object of my invention is the provision of a locking means for tripper type door control mechanisms which is readily adaptable to various installation and operating requirements and which, by inexpensive modifications, can be adapted to provide either (a) a door control mechanism whereby the operator can lock the door from outside of the vehicle by first closing the door and then using the proper key, thus positively preventing the operator from locking himself out, (b) a door control mechanism whereby the operator can lock the door from outside of the vehicle by first closing the door and then using the key or, alternatively, can preset the mechanism, when the door is open, by movement of the inside lock controlling member so that it will automatically become locked when the door is closed, thus permitting the door to be locked without use of the key but also making it possible for the operator to leave his key inside and lock himself out, or (c) a door control mechanism whereby the operator can lock the door from outside of the vehicle by first closing the door and then using the key or, alternatively, can preset the mechanism, when the door is open, by a double or combination operation of two separate members, so that it will automatically become locked upon closing the door, thus giving the operator a greater opportunity to remember if he has inadvertently left his key inside the vehicle and, although requiring more operations than in (b), making it somewhat less likely that he will lock himself out.

Other objects of my invention include: the provision in a door control mechanism of rugged and effective locking means which are incorporated in the structure of the latch mechanism proper and which permit idling movement of the operating push button; the provision of a tripper type door control mechanism including inside and outside lock control means either of which may be moved to locked or unlocked position regardless of the position of the other; the provision in a door control mechanism of effective means for permitting idling of the push button when the door is locked; and the provision of a door control mechanism having locking means which, by relatively minor structural changes in the apparatus, and without substantially changing the overall dimensions thereof, can be modified to fit the preferences of the user.

The above and other objects of my invention will appear from the following description of several embodiments thereof reference being had to the accompanying drawings in which:

Figure 3 is an enlarged vertical cross-sectional view taken substantially on line 3—3 of Figure 1, the door control mechanism being illustrated in operative or door latched position and the locking apparatus being shown in locked position.

Figure 4 is a fragmentary view, taken substantially on line 4—4 of Figure 3, illustrating the relative positions of the detent and transmitting member.

Figure 10 is a view of the door control mechanism, separated from the door with which it is associated, generally similar to Figure 3 but illustrating the latch member in operated or door unlatched position and the locking means in door unlocked position.

Figure 11 is a vertical cross-sectional view taken substantially on line 11—11 of Figure 10.

Figure 12 is a horizontal cross-sectional view of my improved latch mechanism taken substantially on line 12—12 of Figure 10.

Figure 13 is a fragmentary view, taken substantially on line 13—13 of Figure 11, illustrating the relative positions of the detent, actuating member, and transmitting member.

Figure 14 is a horizontal cross-sectional view taken on line 14—14 of Figure 11.

Figure 21 is a view generally similar to Figure 10 but illustrating another modified form of my improved door control mechanism, the latch member being shown in operative or door latched position and the locking means being shown in locked position.

Figure 22 is a fragmentary elevational view, taken on line 22—22 of Figure 21, showing the relative positions of the detent, transmitting member, and transmitting member control element.

Figure 23 is a vertical cross-sectional view taken substantially on line 23—23 of Figure 21.

Figure 24 is a horizontal cross-sectional view taken on line 24—24 of Figure 21.

Figures 28 is a view similar to Figure 25 but showing the parts in the positions they assume when the push button is operated to withdraw the transmitting member control element to permit movement of the transmitting member into locked position.

Figure 29 is a fragmentary view, taken substantially on line 29—29 of Figure 28, illustrating the relative positions of the detent, actuating member, transmitting member, and transmitting member control element.

Figure 30 is a vertical cross-sectional view taken substantially on line 30—30 of Figure 28.

Figures 1, 2:
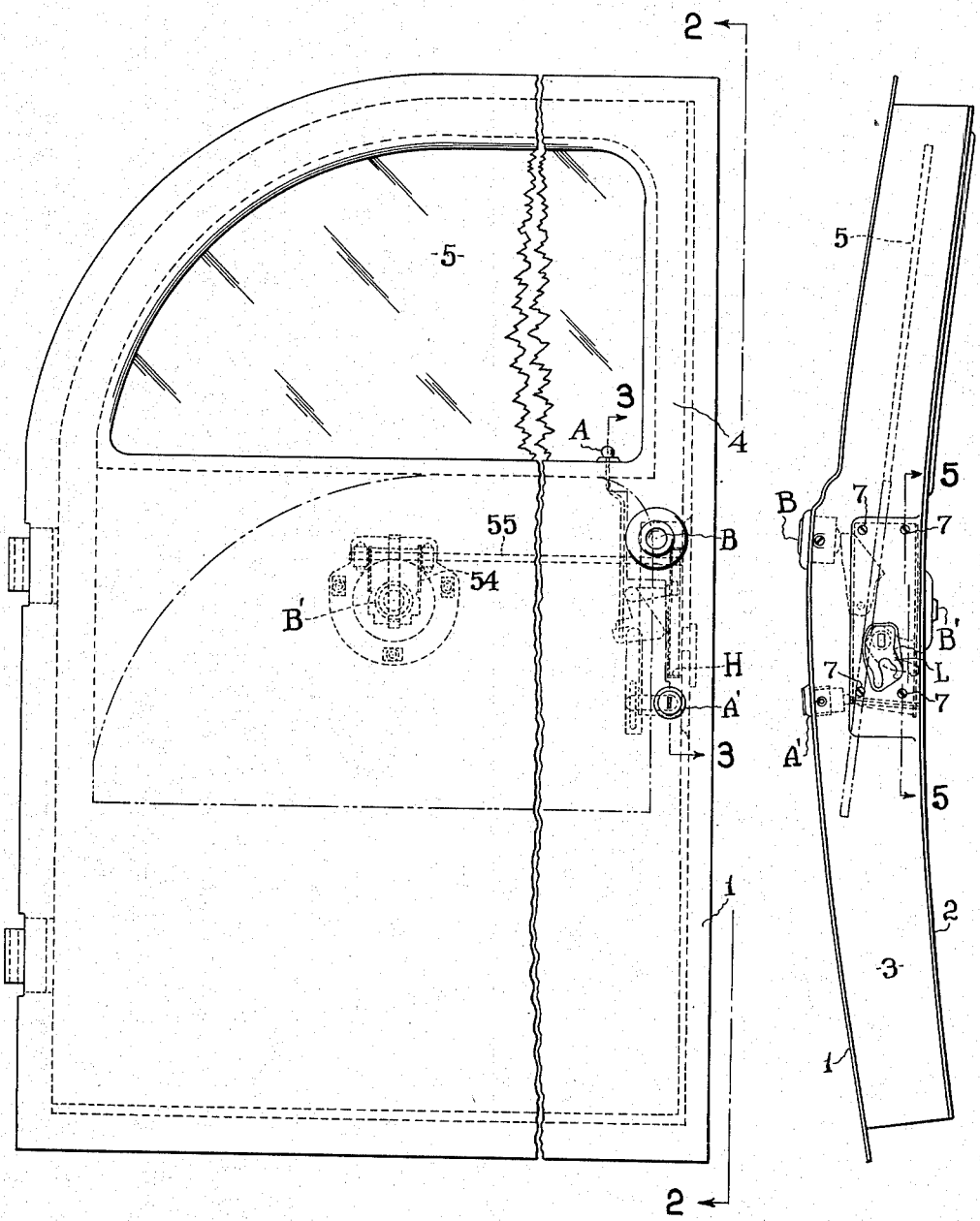
Figure 1 is a side elevation, taken from outside the vehicle, of what may be considered the left-hand front door of an automobile, the door being hinged at its forward edge and equipped with my improved door control mechanism.
Figure 2 is a rear or free edge view of the door and door control mechanism shown in Figure 1, taken substantially on line 2—2 of Figure 1.

In Figure 1 of the drawings I have illustrated an automobile door which includes the usual outer panel 1 and inner panel 2. The free edge wall 3 closes the rear edge of the door structure and forms the outer wall of the door lock pillar 4. The glass 5 is supported in glass run channels 6 (see Figure 3) in the usual manner and suitable means (not shown) are provided for raising and lowering the glass.

My door control mechanism includes a main frame or housing, generally indicated at H, which is mounted on the inner face of the free edge wall 3 as by screws 7. The movable latch member L is supported by the housing H adjacent the outer surface of the free edge wall 3 for movement substantially parallel thereto and it will be understood that a suitable keeper pin or the like (not shown) is mounted on the adjacent door frame (also not shown) and that the latch member L and keeper pin cooperate to effect latching of the door as is fully described in the above identified Schonitzer Patent No. 2,094,413. Manual means for operating the door control mechanism to release the latch from the outside of the door is shown as a push button B, and another push button B' is arranged to effect release of the latch mechanism from the inner side of the door. In Figure 1 the means for manually operating the lock mechanism from inside the door is generally indicated at A while the outside key controlled lock operating unit A' is disposed on the outer panel 1 below the outer push button B. The above brief description is given to assist in an understanding of the general arrangement of my door control mechanism in a typical automobile door and the essential elements will be described more in detail later.

Referring now particularly to Figures 1 to 14 inclusive, an embodiment of my invention will be described whereby the latch mechanism may be locked to prevent unauthorized opening of the door while idling movement of both the outer push button B and inner push button B' is permitted and whereby the operator, when the door is open and he is outside of the vehicle, can lock the door either by first closing it and then using his key in the lock unit A' or, alternatively, can effect locking of the door without use of the key by first moving the inner lock operating means A downwardly into locked position and then shutting the door with resulting automatic locking thereof.

The housing H includes a base plate 8, a cover plate 9, end walls 10 and 11, and an edge wall or flange 12 preferably formed integrally with the base plate 8. A shaft 13 is supported on a suitable bearing in housing H and carries the latch member L which is disposed on the outer side of base plate 8. The latch control element 14 is mounted on the inner end of shaft 13 between the plates 8 and 9 of housing H. The latch member L, shaft 13, and control element 14 comprise what may be termed the "latch unit" and it will be understood where this term is used herein it is intended to refer to and include the latch member proper of a door control mechanism together with the parts which are movable concurrently with the latch member proper and are employed for effecting and controlling its operation.

As seen in Figure 3 the latch member L is in its operative or door latched position in which it engages the keeper pin (not shown) mounted on the door frame and thus holds the door in closed position. A spiral spring 15 is anchored at its lower end in the end wall 11 of the housing H and is secured at its upper end to the control element 14. This spring exerts a force on the latch unit tending to urge same from its operative or door latched position as seen in Figure 3 into its operated or door unlatched position as seen in Figure 10. It will be understood by those skilled in the art that, when in operated or door unlatched position, the latch member L may be freely moved away from the keeper member on the door frame to permit opening of the door, such an arrangement being clearly illustrated and described in said above identified United States patent of Rudolph I. Schonitzer. In order releasably to restrain or hold the latch unit in door latched position a detent, generally indicated at D, is provided. This detent is pivotally supported on a pin 16 carried by the base plate 8 and is provided with an abutment portion 17 adapted to engage a coacting abutment portion 18 on the latch control element 14 to maintain the latch unit in door latched position as seen in Figure 3.

Associated with the detent D and supported on the pin 16 for pivotal movement independently of but concentrically with the detent D is an actuating member generally indicated at M. A spring 19 is carried by the frame H and has its upper free end in engagement with a flange 20 of the actuating member M and exerts a force thereon urging the actuating member M in counterclockwise direction as seen in Figure 3.

The details of the detent D and actuating member M are best seen in Figures 6 to 9 inclusive. Detent D includes an arm portion 21 having an outwardly or generally radially extending contact face 22 while actuating member M is formed with a corresponding arm portion 23 having a flange forming a similar outwardly or generally radially extending contact face 24. The portion 23' of arm 23 is bent outwardly to form a ramp for guiding a transmitting member T under certain conditions, as will be later explained. An upper operating flange 25 is formed on the member M and, as is seen in Figure 3, is adapted to be engaged by the arm 57 of pawl P of the inside push button mechanism as will be more fully described later. Another operating flange 26 is formed on the member M for engagement by the arm 27 to transmit movement of the outside push button B to the member M.

Figure 6:
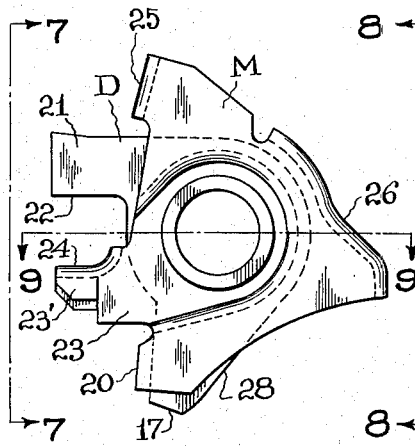
Figure 6 is an enlarged detached illustrative view showing the detent and its associated actuating member.
Figures 7, 8:
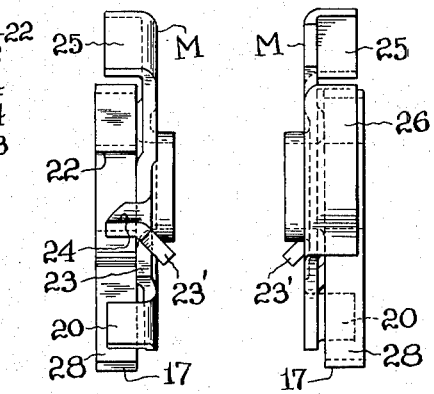
Figure 7 is an edge view of the parts shown in Figure 6, taken substantially on line 7—7 of Figure 6.
Figure 8 is an opposite edge view of the parts shown in Figure 6, taken substantially on line 8—8 of Figure 6.
Figure 9:
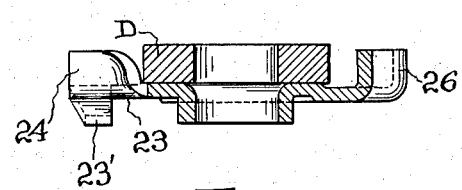
Figure 9 is a horizontal cross-sectional view taken substantially on line 9—9 of Figure 6.

As is seen in Figures 3 and 6, the edge face of the downwardly extending arm portion 28 of detent D is adapted to be engaged by the flange 20 of the actuating member M. Thus the force exerted by the spring 19 on the flange 20 of member M is transmitted to the detent D through its arm portion 28 which also carries the detent abutment 17 previously referred to.

Figure 5:
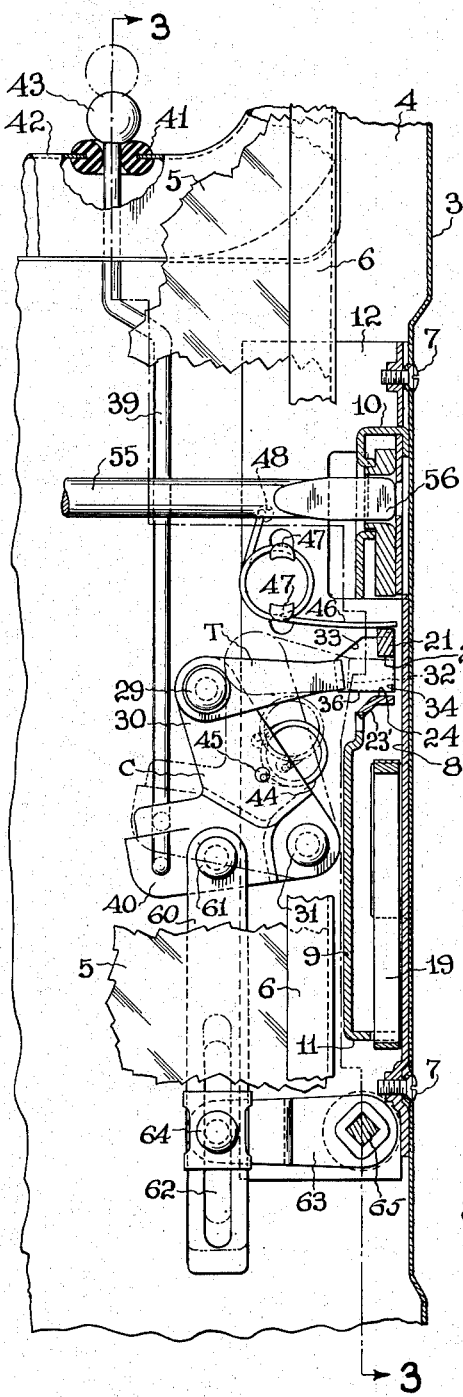
Figure 5 is a vertical cross-sectional view taken substantially on line 5—5 of Figure 3.

When in the positions shown in Figures 3 and 5 the face 22 of detent arm 21 and the face 24 of the actuating member arm 23 are disposed in spaced apart, axially aligned, substantially parallel, generally radially extending relation. In order to provide an operating connection between the actuating member M and the detent D, which as noted above are pivotally supported for independent movement about the same center, I employ the transmitting member generally indicated at T. This transmitting member T is pivotally supported at its outer end on a suitable pin 29 carried by the upper arm 30 of a bell crank C. The side flange 12 of housing H provides a support for the bell crank C which is pivotally secured thereto at 31.

As may be clearly seen in Figures 10 and 12 the transmitting member T has an end flange portion 32 which extends into a guide aperture 33 in the side flange 12 of housing H and also, when in unlocked position (as will be later explained), is disposed between the contact face 22 of detent D and contact face 24 of actuating member M. Movement of the end flange portion 32 of transmitting member T in advancing or unlocking direction towards the detent D is limited by the outer edge 34 of guide aperture 33 and withdrawing or locking movement thereof in the opposite direction is limited by the inner edge 35 of aperture 33 (see Figures 4 and 5). Aperture 33 is further defined by a lower edge 36, an upper edge 37 and an inclined camming edge 38, all of which are indicated on Figure 4 but, because of space limitations, are not indicated on some of the other views.

To effect movement of the transmitting member T between its advanced or unlocked transmitting position (Figures 10 and 11) and its withdrawn or locked non-transmitting position (Figures 3 and 5) from the inner side of the door, a rod 39 is secured at its lower end to the arm 40 of bell crank C and extends upwardly through a suitable grommet or washer 41 in the garnish molding 42 of the window frame. A knob 43 on the upper end of rod 39 facilitates manual operation of the inside lock controlling means which has previously been generally referred to by the reference character A. When the knob 43 is in its lower position, as seen in full lines in Figure 5, the transmitting member T is in withdrawn or locked position. When the knob 43 is lifted into the phantom line position shown in Figure 5 its associated parts are moved into unlocked position as seen in Figure 11 with the transmitting member T in advanced or unlocked position.

A snap-over spring 44 has one end supported by the edge flange 12 of housing H and its other end engaging the bell crank C at 45. This spring is so arranged relative to the pivot pin 31 of the bell crank C that when the knob 43 is depressed, as seen in Figure 5, it urges the bell crank in counterclockwise direction and retains the parts which are associated with the bell crank in locked position. When the knob 43 is lifted from the position shown in Figure 5 in full lines into its phantom line position, the spring 44, at an intermediate point in the travel of the transmitting member T toward advanced or unlocked position, snaps over and urges the bell crank in clockwise direction as seen in Figure 5, thus retaining the bell crank C, transmitting member T, rod 39 and knob 43 in an unlocked position.

To effect movement of the transmitting member T between its advanced or unlocked positions (Figures 10 and 11) and its withdrawn or locked positions (Figures 3 and 5) from the outside of the door a key actuated hook-up of the type described and claimed in my previously referred to copending U. S. patent application Serial No. 746,521, filed May 7, 1947, may be employed. As seen in Figures 3 and 5 this hook-up includes a link 60 pivotally secured to the lower arm 40 of bell crank C at 61 and having a slot 62 in its lower portion. The arm 63 is pivotally mounted on the edge flange 12 of the housing H and carries a pin 64 extending through and having sliding movement in slot 62. Arm 63 is provided with a square hole at its pivoted end into which the inner end of the square shaft 65 extends. The outer end of shaft 65 connects to the cylinder 66 of the lock unit 67 which is mounted on the outer door panel 1. When the key, indicated in phantom lines at 68 in Figure 3, is turned the shaft 65 turns correspondingly, moving the arm 63 and operating the bell crank C through the link 60 and its pin and slot connection thereto. This arrangement, as is fully explained in my said copending U. S. patent application Serial No. 746,521, permits independent selective actuation of the locking mechanism from either side of the door regardless of the position that the locking mechanism may have been moved into from the other side of the door.

An auxiliary detent spring 46 is supported on the edge flange 12 as by tangs 47 and has its outer end anchored to the flange 12 at 48. The inner end of spring 46 engages the arm portion 21 of detent D and tends to urge same in counterclockwise direction as seen in Figure 3. The function of this spring will be explained later in the description of the operation of the apparatus.

It has been previously pointed out that the detent control arm 27 engages the actuating member M and it will be seen from Figure 3 that this arm is pivotally supported in the housing H at 49. Movement of arm 27 is limited and guided by a pin 50 secured to the base plate 8 of housing H and projecting through a slot 51 in arm 27. The outer push button B carries a plunger portion 52 which is slidably supported in the housing 53 and is provided with a return spring (not shown) tending to return the button B to its outer position after depression thereof. The inner end of plunger 52 is adapted to engage a flange 27' on arm 27 and it will be seen from Figure 3 that depression of the push button B from its full line position will cause corresponding movement of arm 27 in counterclockwise direction about its pivotal support 49.

The actuating member M is operated from the inner side of the door by the push button B' which engages the downwardly extending arm 54 secured to the operating shaft 55 (Figure 1). As is seen in Figures 3 and 5 the end of shaft 55 is flattened at 56 and projects into a corresponding slot in the pawl P which is suitably supported for limited rotational movement in the housing H. This pawl P has angularly spaced arms 57 and 58 (Figure 3) which are adapted to engage respectively the upper operating flange 25 of actuating member M and a flange 59 on arm 27. Thus when the inner push button B' is depressed the shaft 55 will be turned in counterclockwise direction, as seen in Figure 3, and arm 57 will impart clockwise movement to the actuating member M. In some installations the inner push button B' may be arranged so that depression thereof will move the shaft 55 in clockwise direction as seen in Figure 3 and in such cases the arm 58 of pawl P will engage the flange 59 of arm 27 and impart counterclockwise movement to arm 27 which will be transmitted to the actuating member M through the engagement therebetween at 26' to give clockwise (latch releasing) movement to actuating member M.

The operation of the embodiment of my invention shown in Figures 1 to 14 inclusive will now be described. When the vehicle door is closed the latch member L is in its operative or door latched position as seen in Figure 3 and is held therein by engagement of the abutment 17 of detent D with the abutment 18 of the control element 14. As the spring 19 urges the actuating member M in counterclockwise direction (Figure 3) and as the flange 20 of member M engages the downwardly extending arm 28 of detent D, spring 19 also acts to urge detent D in counterclockwise direction toward its latch restraining position seen in Figure 3. When an attempt is made to open the vehicle door from outside by pushing on the outside push button B the arm 27 will be moved about its pivot 49 and will move the actuating member M in clockwise direction against the spring 19. In Figures 3, 4 and 5 the transmitting member T is shown in its withdrawn or locked position and, when in this position, the above described operation of the push button will cause the actuating member M to move from its full line position toward its phantom line position (Figure 3) but no movement of the detent will take place because, with the transmitting member T withdrawn completely out of the paths of movement of the detent D and actuating member M, there is no operating connection between the actuating member M and detent D. When the push button B is released after being depressed spring 19 will return the actuating member M and the arm 27 to their full line positions of Figure 3. From the above description of the operation of the apparatus with the parts in the positions shown in Figures 3, 4, and 5 it is seen that when the door is closed and locked the outside push button B may be idled at will without release of the latch mechanism. The phantom line position of plunger 52 in Figure 3 represents the inner limit of its movement. From the phantom line position of arm 27 in Figure 3 it will be seen that arm 27 and actuating member M may have greater movement than can be imparted to them through push button B. This arrangement reduces the accuracy required in installation and makes it impossible to overload or damage the latch mechanism by pressure on the push button.

In like manner, with the transmitting member T withdrawn as seen in Figures 3 and 5, the inside push button B' may be idled without releasing the latch, such operation merely causing idling movement of the actuating member M through engagement of the arm 57 of pawl P with flange 25 of actuating member M.

From the above description it will be seen that when the transmitting member T is placed in its withdrawn, non-transmitting or locked position, with the flange 32 in engagement with the edge wall 35 of aperture 33, the latch mechanism is effectively locked and the push buttons B and B' may be idled at will without releasing or exerting dangerous pressure upon any parts of the mechanism.

To unlock the door control mechanism it is only necessary to lift the knob 43 into its phantom line position, as seen in Figure 5, thus moving the bell crank C into its upper position, also seen in phantom lines in Figure 5, and advancing the transmitting member T into its unlocked or transmitting position with the end flange 32 thereof disposed in the paths of movement of both the detent D and actuating member M between the face 24 of arm 23 of the actuating member M and the face 22 of arm 21 of the detent D. Of course, the same movement of the bell crank C and transmitting member T may be effected by turning the key 68 to rotate arm 63 and lift the bell crank C through the link 60.

When the mechanism has been unlocked, either from inside or outside the vehicle, the parts assume the positions seen in Figures 10 and 11. Now, if the push button B is depressed the arm 27 will be moved about its pivot 49 imparting clockwise movement to the actuating member M which movement will be transmitted through the end of the transmitting member T to the arm 21 of detent D causing the detent to move in clockwise direction with the actuating member M and the abutment 17 of detent D to be disengaged from the abutment 18 of the control element 14. As soon as this disengagement occurs the latch unit is free to move from its door latched position as seen in Figure 3 into its door unlatched position as seen in Figure 10 and such movement occurs concurrently with opening of the door and is assisted by the spiral spring 15. The full unlatched position of the mechanism is shown in Figures 10 and 11.

When the transmitting member T is in advanced or unlocked position as seen in Figures 10 and 11 its end portion 32, which is disposed between the actuating member M and the detent D, must be movable with the member M and detent D during their movements into and out of latch restraining position (Figure 3). This movement of the transmitting member T is permitted by the pivotal connection 29 of the transmitting member with the bell crank C and by the guide opening 33 which does not restrict such swinging movement of the transmitting member T about its pivot 29.

In the apparatus thus far described the transmitting member T may be moved from its unlocked or advanced position into its locked or withdrawn position at any time. This will be evident from inspection of Figures 4, 5, 11 and 13 which illustrate the clear path for the end portion 32 of transmitting member T from advanced to withdrawn position. Also, the transmitting member T may be moved at any time in the opposite direction from its locked or withdrawn position into its unlocked or advanced position. Figures 11 and 13 illustrate how the ramp portion 23' of actuating member M forms an incline which lifts the end 32 of transmitting member T up into the space between faces 22 and 24 of detent D and actuating member M respectively when the transmitting member T is moved from its withdrawn or locked position into its advanced or unlocked position, the latch member L and its associated parts being in door unlatched position. Thus the operator can set the mechanism in either locked or unlocked condition by use of the inside control knob 43 or the outside key 68 under all conditions and positions of the latch mechanism.

In order to enable the apparatus to function as described it is desirable that the transmitting member T move into the same locked or withdrawn position regardless of whether it starts from the door latched or the door unlatched positions of the detent D and actuating member M. Referring to Figure 5, the unlocked or advanced position of transmitting member T is seen in phantom lines and it will be observed that when the bell crank C is moved in counterclockwise direction member T will be withdrawn and its end portion 32 will move horizontally along the lower edge 36 of aperture 33 until it reaches its retracted or locked position seen in full lines. When the latch mechanism is in unlatched position as seen in Figures 10 and 11, however, the end 32 of transmitting member T is elevated above the lower edge 36 of aperture 33 and is held in such elevated position by the arm 23 of actuating member M. If it is desired to move transmitting member T into locked position under the conditions just described the bell crank arm C will be moved into counterclockwise direction (Figure 11) causing the end flange 32 of transmitting member T to be withdrawn in a generally horizontal direction until it strikes the inclined or camming edge 38 of aperture 33 which, during the final portion of the withdrawing or locking movement, will cam the end 32 of transmitting member T downwardly until it reaches the phantom line position of Figure 11 which is substantially the identical position of the transmitting member shown in full lines in Figure 5. It will be seen that if the inclined or camming edge surface 38 were not provided the end 32 of transmitting member T might, after being withdrawn from between the actuating member M and detent D when they are in their unlatched positions, remain in an elevated position where, on its next advancing or unlocking movement, it would not slip into its transmitting position between the actuating member M and detent D.

The function of the spring 46 which bears against the top of arm 21 of detent D is to exert a force tending to retain detent D in latch restraining position (Figure 3) when the actuating member M is idled into its phantom line position (Figure 3) with the transmitting member T in withdrawn or locked position. In some cases such a spring may not be required as the action of spiral spring 15 will normally cause sufficient pressure between the abutments 17 and 18 to prevent the detent D from moving when the transmitting member T is in non-transmitting or locked position and the actuating member M is idled.

From the above description of the operation of the apparatus illustrated in Figures 1 to 14 it will be seen that this mechanism provides means whereby the operator when he gets out of the vehicle, the transmitting member T being in its unlocked or advanced position, may either first close the door causing the latch unit, actuating member, and detent D to move into their door latched positions as seen in Figure 3 and then use his key to rotate the bell crank C to withdraw the transmitting member and lock the mechanism or, alternatively, he may, while the door is still open and the latch mechanism is in unlatched position as seen in Figures 10 and 11, push down on the knob 43 to withdraw the transmitting member T into its locked position as seen in phantom lines in Figure 11. By then merely closing the door the latch mechanism will move into its door latched position as seen in Figure 3 and will be automatically locked against unauthorized entry without use of the key. Pressure on the outer push button B will merely cause idling movement of the arm 27 and actuating member M. Of course, regardless of the manner in which the door is locked, and providing the windows are closed and the other doors are locked, it may only be unlocked, from outside the vehicle, by use of the key.

With the arrangement described above and illustrated in Figures 1 to 14 the operator may very conveniently lock the door as he gets out of the vehicle by merely pushing down on the knob 43 and then shutting the door. It is possible however for him to lock his keys in the vehicle and lock himself out as would occur if he inadvertently left his keys in the ignition and got out of the door and locked it by operating the knob 43. In Figures 15 to 20 inclusive I have illustrated a modification of my door control mechanism whereby the operator cannot lock himself out as the door can only be locked from outside by means of the key and only when the latch mechanism is in door latched position, thus requiring the door to be closed and the operator to have his key in his hand when he locks the door and eliminating the possibility of his leaving the key in the vehicle and inadvertently locking the door.

Figures 15, 16:
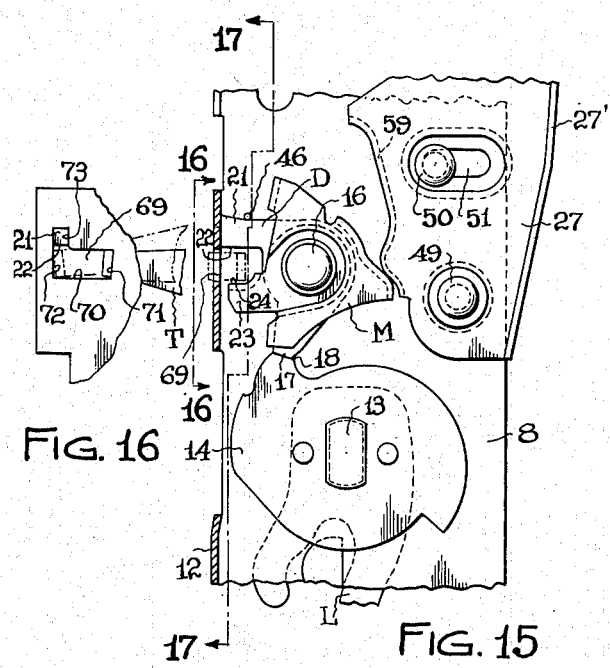
Figure 15 is a view generally similar to Figure 3 but simplified by eliminating certain parts not associated with the locking means and illustrating a modified form of my improved locking means, the latch being shown in operative or door latched position and the lock means being shown in locked position.
Figure 16 is a fragmentary view, taken substantially on line 16—16 of Figure 15, illustrating the relative positions of the detent and transmitting member.
Figure 17:
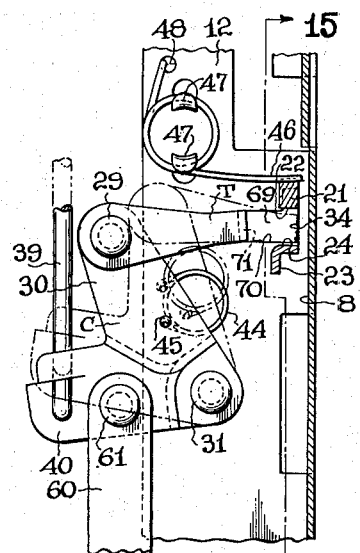
Figure 17 is a vertical cross-sectional view taken substantially on line 17—17 of Figure 16.
Figures 18, 19:
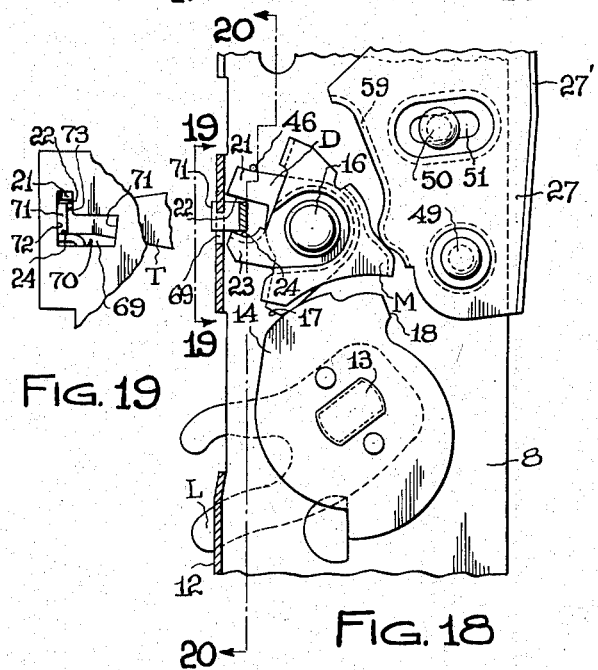
Figure 18 is a view similar to Figure 15 but illustrating the latch member in operated or door unlatched position and the locking means in unlocked position.
Figure 19 is a fragmentary view, taken substantially on line 19—19 of Figure 18, illustrating the relative positions of the detent, actuating member, and transmitting member.
Figure 20:
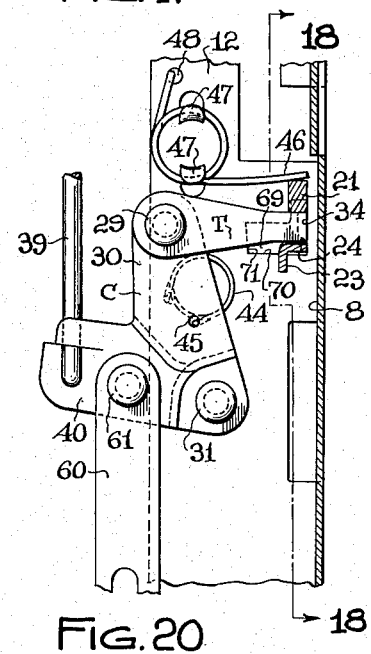
Figure 20 is a vertical cross-sectional view taken substantially on line 20—20 of Figure 18.

Figures 15 to 20 are in somewhat simplified form, certain parts which were previously explained being omitted. As this embodiment of my invention possesses many features in common with that illustrated in Figures 1 to 14, similar reference characters have been applied to similar parts and it will be understood that the operation of the various parts is in many cases identical with that previously described. Generally speaking the apparatus in Figures 15 to 20 is the same as that of Figures 1 to 14 except for the shape of the guide aperture for the end portion 32 of transmitting member T. As is perhaps best seen in Figure 16 the transmitting member guide aperture 69 in this form of my invention is generally L-shaped having a bottom edge 70, an outer edge 71, an inner edge 72 and a blocking edge 73 spaced from and substantially parallel to inner edge 72. When the latch mechanism is in door latched position as seen in Figures 15 and 17 the transmitting member T may be freely moved into and out of advanced or unlocked position, the end portion 32 traveling substantially in a horizontal path during such movement. However, when the latch mechanism moves into unlatched position as seen in Figures 18 and 20 upon opening of the door, if the transmitting member T is in its unlocked position as seen in Figure 20 it will be lifted by the rotation of the actuating member M from the position shown in Figure 15 to that shown in Figure 18 and the end flange 32 of transmitting member T will be moved up into the notch or recess between the edges 72 and 73 of the guide aperture 69. When in this position the transmitting member T cannot be withdrawn into its locked position as it is retained against such movement by the blocking edge 73. Thus, in this form of my apparatus, when the operator opens the door of the vehicle the latch mechanism necessarily moves into its unlatched position as seen in Figures 18 and 20 and he cannot withdraw the transmitting member T into locked position either by pressure on the knob 43 or by use of his key until he first closes the door and thus moves the latch mechanism into door latched position as seen in Figures 15 and 17 with concurrent lowering of the transmitting member T out of the blocking notch in the aperture 69. With the door closed, and assuming that the windows are also closed, the operator must have his key in his hand before he can lock the door and thus it is impossible for him to lock the door with his key inside the vehicle and the windows closed.

In order to render it somewhat less likely that the operator will lock his keys in the vehicle than when the arrangement of Figures 1 to 14 is employed, but to still permit him to lock the door without having to use his key, I have provided another modification of my apparatus which is illustrated in Figures 21 to 30 inclusive. This apparatus is similar to that illustrated in Figures 1 to 14 inclusive except that it includes additional means whereby the operator is required to perform another operation, in addition to pushing down on the inner locking knob 43 before he can preset the latch mechanism so that it will automatically be locked when the door is closed. Except for this auxiliary mechanism the apparatus of Figures 21 to 30 is substantially identical with that of Figures 1 to 14. Accordingly like reference characters have been used for identifying like parts and parts which are common to both embodiments and have substantially the same mode of operation in both embodiments will not again be explained in detail.

In Figures 21 to 24 inclusive the door control mechanism is shown in door latched and locked position it being noted that the latch member L is held in latched position by the detent D and that the transmitting member T is in its withdrawn or locked position whereby the actuating member M may have movement under the influence of the pawl P or the arm 27, without accompanying movement of the detent D. The guide aperture 33 is of the same shape as shown in Figures 3, 4 and 5 and functions in the same manner as previously explained in describing the mechanism of Figures 3, 4, and 5.

In order to establish an auxiliary operation which must be performed by the operator to preset the mechanism so that it will automatically lock when the door is closed, I provide a transmitting member control element which is generally indicated at E. This element E is supported for sliding movement on the side flange 12 of the housing H by means of pins 74 which extend through slots 75 in element E. Thus the element E is guided for straight line movement generally parallel to the base plate 8.

A projecting portion 76 at the lower end of control element E is adapted, when element E is in its lower position, to block off the angle corner of aperture 33 and provide a blocking edge by changing the effective shape of this aperture to be L-shaped substantially like that of aperture 69 of the embodiment illustrated in Figures 15 to 20. This position of control element E is seen in Figures 21, 23, 25, and 27 while in Figures 28 and 30 the control element is shown in its elevated or withdrawn position wherein the projection 76 is disposed above the top of aperture 33 and therefore the effective shape of aperture 33 is the same as that explained in describing Figures 1 to 14.

To impart the desired lifting and lowering movement to control element E a flange 77 is formed at the upper end thereof extending generally parallel to but spaced from base plate 8. A lever 78 is pivotally supported on the base plate 8 at 79 and has a flange 80 at one end projecting through an aperture 81 in flange 77 of element E. In order to bias lever 78 in counterclockwise direction, as seen in Figure 21, and thus to tend to urge the control element E to its lower or transmitting member blocking position I provide a spring 82 which is anchored at one end on the base plate 8 at 83, and circles the pivot 79, and has its opposite end engaging the flange 80 of lever 78.

The opposite end of lever 78 is formed with a slot 84 through which extends a pin 85 carried by the upper end of arm 27 and it will be seen from Figure 21 that when the lever 27 is in its full line position (which is the position it assumes when the outside push button B is not depressed), the transmitting member control element E is in its lower position with the projection 76 blocking off a part of aperture 33 to give it an L-shaped contour. When the arm 27 is moved in counterclockwise direction by action of outer push button B, the engagement of pin 85 with lever 78 through slot 84 will move lever 78 in clockwise direction (Figure 21) causing the flange 80 to engage the upper edge of aperture 81 and lift control element E into its transmitting member released position as seen in phantom lines in Figure 21 and in full lines in Figures 28 and 30. Return of arm 27 to its original position upon release of the push button again lowers the element E back into its transmitting member blocking position seen in Figures 21 and 23.

Figure 25:
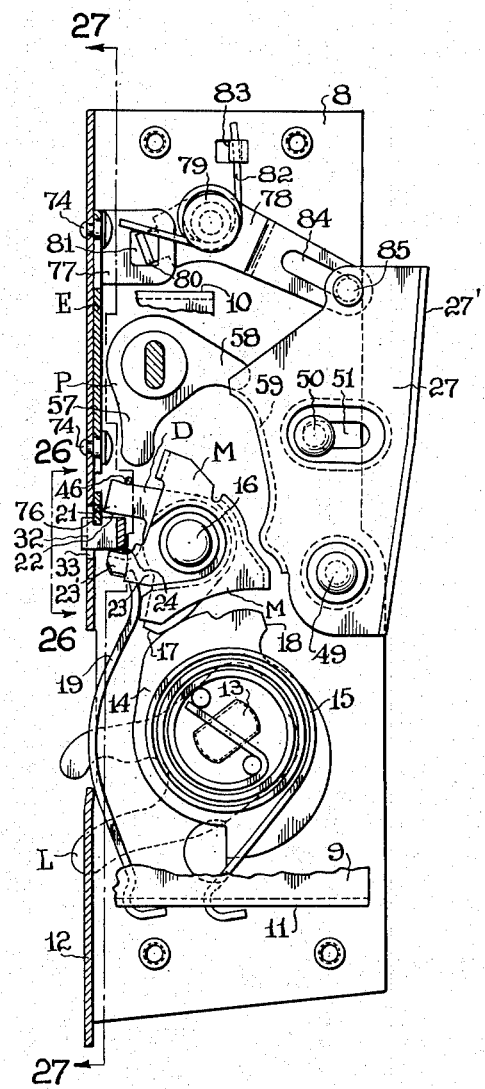
Figure 25 is a view similar to Figure 21 but illustrating the door control mechanism in unlatched position, the locking means being shown in unlocked position and the transmitting member control element being disposed to prevent withdrawal of the transmitting member from unlocked position.

The operation of the apparatus shown in Figures 21–30 is as follows: when transmitting member T is in its advanced or unlocked position, as seen in Figures 25 to 30, operation of the push buttons B or B' will, if the latch is in its door latched position, effect release thereof. During movement of the detent D and actuating member M from their latch restraining positions seen in Figure 21 to their latch released positions seen in Figure 25, the end portion 32 of transmitting member T will be raised and lowered in the aperture 33. Each time the arm 27 is moved from its neutral position as seen in Figures 21 and 25 into an operated position as indicated in Figure 28 it will lift the control element E so that the end portion 76 thereof does not overlap the aperture 33. Return of arm 27 to its neutral position also returns control element E to its lower overlapping or blocking position. Such movement of element E however has no effect upon the operation of the latch mechanism in its normal manner when the transmitting member T is in advanced or unlocked position.

Figure 26:
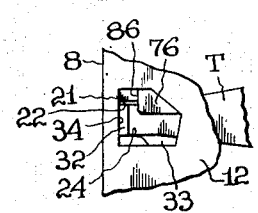
Figure 26 is a fragmentary view, taken substantially on line 26—26 of Figure 25, illustrating the relative positions of the detent, actuating member, transmitting member, and transmitting member control element.
Figure 27:
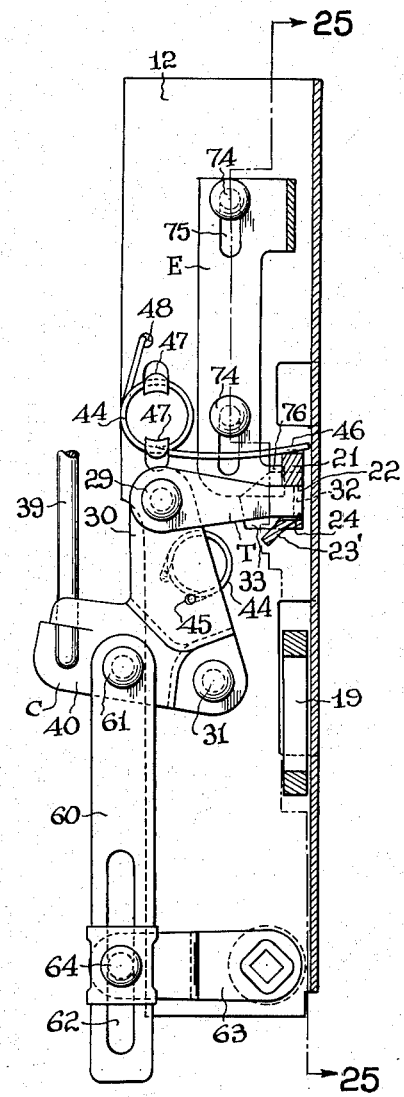
Figure 27 is a vertical cross-sectional view taken substantially on line 27—27 of Figure 25.

As will be observed from Figure 23 transmitting member T may be withdrawn from and returned to unlocked position at any time when the latch mechanism is in door latched position. However, when the door has been opened and the latch mechanism is in door unlatched position as seen in Figures 25 to 27, the end portion 32 of transmitting member M has been moved up into the recess or slot defined by the edge 34 of aperture 33 and the end 86 (see Figure 22) of projection 76 on element E. When in this position the result is the same as occurs when transmitting member T is moved into the corresponding slot of aperture 69 of Figures 15 to 20 and transmitting member T cannot be moved into locked position. Now, if the operator is outside of the vehicle and he desires to close and lock the door he may do so by shutting the door and then using his key to actuate bell crank C through link 60 to withdraw the transmitting member into locked position. Alternatively, if he does not desire to use his key he may lock the door by first exerting pressure on the outside push button B which, through arm 27, will lift the transmitting member control element E from its transmitting member blocking position as seen in Figures 25, 26 and 27 into its elevated or transmitting member free or released position seen in Figures 28, 29, and 30. While holding the push button B depressed the operator reaches around to the inside of the door and with his other hand depresses the knob 43 to move bell crank C in counterclockwise direction with resulting retraction of transmitting member T from its unlocked position as seen in full lines in Figure 30 into its locked position as seen in phantom lines in Figure 30. Upon closing the door it automatically becomes locked and idling movement of the push button B will be permitted in the manner which has been previously explained. To unlock the door from outside the vehicle it is necessary to use the key to move transmitting member T into unlocked position.

By providing means for varying the shape of the guiding aperture 33 an additional operation is required on the part of the operator before he can preset the mechanism so that it will automatically become locked when the door is closed. This arrangement may be considered desirable in some instances where it is felt that the operator will be less likely to leave his key in the vehicle and lock himself out if he must perform several interrelated operations before he can lock the door by merely closing it. As in the embodiment of Figures 1 to 14, the transmitting member T of Figures 21 to 30 can be moved from locked to unlocked position and return at any time, the only difference in the operation of the latter embodiment being that, when the latch unit is in unlatched position, the push button B must first be depressed before the transmitting member can be moved from one end position to the other.

Although I have described the illustrated embodiments of my invention in considerable detail it will be understood that variations and modifications may be made in the form, arrangement and assembly of the various parts and elements without departing from the spirit of my invention. Accordingly I do not wish to be limited to the particular mechanisms herein shown and described but claim as my invention all forms thereof coming within the scope of the appended claims.

I claim:

1. Door control mechanism including a support having a plate portion adapted to face the jamb of the door and provided at its inner edge with a flange portion, a latch member supported for movement between a door latched position and a door unlatched position, a detent adapted releasably to restrain said latch member in said door latched position, means for pivotally supporting said detent for movement between a latch restraining position and a latch released position, an actuating member pivotally mounted on said plate portion, means for pivotally supporting said actuating member for movement adjacent to and concentrically with said detent, said detent and actuating member having spaced generally radially extending contact faces, a transmitting member, and means for moving said transmitting member in a generally axial direction relative to said pivotally supported detent and actuating member between a non-transmitting or locked position out of the paths of movement of both of said contact faces and a transmitting or unlocked position between said spaced faces and in the paths of movement thereof.

2. Door control mechanism including a support having a plate portion adapted to face the jamb of the door and provided at its inner edge with a flange portion, a latch member supported for movement between a door latched position and a door unlatched position, a detent adapted releasably to restrain said latch member in said door latched position, means for pivotally supporting said detent for movement between a latch restraining position and a latch released position, an actuating member, means for pivotally supporting said actuating member for movement adjacent to and concentrically with said detent, said detent and actuating member having spaced generally radially extending contact faces, a transmitting member, means carried by said flange portion for moving said transmitting member in a generally axial direction relative to said pivotally supported detent and actuating member between a non-transmitting locked or withdrawn position out of the paths of movement of both of said contact faces and a transmitting unlocked or operating position between said spaced faces and in the paths of movement thereof, and pivot means on said means carried by said flange portion for supporting said transmitting member for movement with said detent and actuating member when same are moved about their said pivotally supporting means from latch restraining to latch released position and return.

3. Door control mechanism including a latch member supported for movement between a door latched position and a door unlatched position, a detent adapted releasably to restrain said latch member in said door latched position, means for pivotally supporting said detent for movement between a latch restraining position and a latch released position, an actuating member, means for pivotally supporting said actuating member for movement adjacent to and concentrically with said detent, said detent and actuating member having spaced generally radially extending contact faces, a transmitting member, means for moving said transmitting member in a generally axial direction relative to said pivotally supported detent and actuating member between a non-transmitting locked or withdrawn position out of the paths of movement of both of said contact faces and a transmitting unlocked or operating position between said spaced faces and in the paths of movement thereof, means for supporting said transmitting member for movement with said detent and actuating member when same are moved about their said pivotally supporting means from latch restraining to latch released position and return, and means for guiding said transmitting member into the same withdrawn position regardless of whether its movement thereinto starts when said detent and said actuating member are in their latch restraining positions or their latch released positions.

4. A door control mechanism including a frame structure, a latch member, a detent, an actuating member, a transmitting member, said detent and actuating member having spaced surfaces between which said transmitting member is adapted to be disposed to effect an operating connection therebetween, a transmitting member support movable toward and away from said spaced surfaces, means for pivotally mounting said transmitting member on said support for movement therewith while permitting relative movement therebetween, said frame structure having a guide aperture and said transmitting member having a portion extending thereinto, said guide aperture having a camming edge disposed in the path of said portion of said transmitting member as it is moved away from said surfaces when said detent and actuating member are in one position but out of the path of said portion of said transmitting member when it is moved away from said surfaces when said detent and actuating member are in another position, and means for moving said transmitting member support to effect movement of said transmitting member toward and away from said surfaces.

5. In door control mechanism, a latch member supported for movement between a door latched position and a door unlatched position, a detent, an actuating member, a transmitting member, means for selectively positioning said transmitting member in either transmitting or non-transmitting position relative to said detent and said actuating member, and means for blocking said transmitting member against movement from transmitting or unlocked position to non-transmitting or locked position when said latch member is in said door unlatched position.

6. Door control mechanism including a latch member supported for movement between a door latched position and a door unlatched position, a detent adapted releasably to restrain said latch member in said door latched position, an actuating member, a transmitting member adapted when in transmitting position to effect an operating connection between said detent and said actuating member and when in non-transmitting position to permit idling movement of said actuating member without corresponding movement of said detent, manually operable means for selectively positioning said transmitting member in either said transmitting position or said non-transmitting position, and means for blocking said transmitting member against movement from transmitting position into non-transmitting position when said detent and actuating member are in latch released position.

7. Door control mechanism including a latch member supported for movement between a door latched position and a door unlatched position, a detent adapted releasably to restrain said latch member in said door latched position, an actuating member, a transmitting member adapted when in transmitting position to effect an operating connection between said detent and said actuating member and when in non-transmitting position to permit idling movement of said actuating member without corresponding movement of said detent, manually operable means for selectively positioning said transmitting member in either said transmitting position or said non-transmitting position, and means for blocking said transmitting member against movement from transmitting position into non-transmitting position when said detent and actuating member are in latch released position, said last named means including a guide aperture into which a portion of said transmitting member extends, said aperture having a blocking edge disposed in the path of said portion of said transmitting member when said transmitting member is in transmitting position and said detent and actuating member are in their latch released positions.

8. In door control mechanism, a latch member supported for movement between a door latched position and a door unlatched position, a detent, an actuating member, a transmitting member, means for selectively positioning said transmitting member in either transmitting or non-transmitting position relative to said detent and said actuating member, means for blocking said transmitting member against movement from transmitting or unlocked position to non-transmitting or locked position when said latch member is in said door unlatched position, and means, operable independently of said transmitting member positioning means, for rendering said blocking means ineffective to block said transmitting member.

9. In door control mechanism, a latch member supported for movement between a door latched position and a door unlatched position, a detent, an actuating member, a transmitting member, means for selectively positioning said transmitting member in either transmitting or non-transmitting position relative to said detent and said actuating member, means for blocking said transmitting member against movement from transmitting or unlocked position to non-transmitting or locked position when said latch member is in said door unlatched position, a push button or the like for effecting release of the mechanism from door latched position, and means, operable upon actuation of said push button or the like in door unlatching direction, for rendering said blocking means ineffective to block said transmitting member.

10. In door control mechanism, a latch member supported for movement between a door latched position and a door unlatched position, a detent, an actuating member, a transmitting member, means for selectively positioning said transmitting member in either transmitting or non-transmitting position relative to said detent and said actuating member, means for blocking said transmitting member against movement from transmitting or unlocked position to non-transmitting or locked position when said latch member is in said door unlatched position, a push button or the like for effecting release of the mechanism from door latched position, and means, operable upon actuation of said push button or the like in door unlatching direction, for rendering said blocking means ineffective to block said transmitting member only while said push button or the like is maintained in its door unlatching position.

11. Door control mechanism including a latch member supported for movement between a door latched position and a door unlatched position, a detent adapted releasably to restrain said latch member in said door latched position, an actuating member, a transmitting member adapted when in transmitting position to effect an operating connection between said detent and said actuating member and when in non-transmitting position to permit idling movement of said actuating member without corresponding movement of said detent, manually operable means for selectively positioning said transmitting member in either said transmitting position or said non-transmitting position, means for blocking said transmitting member against movement from transmitting position into non-transmitting position when said detent and actuating member are in latch released position, said last named means including a guide aperture into which a portion of said transmitting member extends, said aperture having a blocking edge disposed in the path of said portion of said transmitting member only when said transmitting member is in transmitting position and said detent and actuating member are in their latch released positions, and manually actuable means, operable independently of said transmitting member positioning means, for changing the effective shape of said guide aperture to permit withdrawal of said transmitting member from transmitting position into non-transmitting position when said detent and actuating member are in their latch released positions.

12. Door control mechanism including a latch member supported for movement between a door latched position and a door unlatched position, a detent, an actuating member, a transmitting member, means for selectively positioning said transmitting member in either transmitting or non-transmitting position relative to said detent and said actuating member, a transmitting member control element supported for movement between a transmitting member blocking position and a transmitting member released position, spring means for urging said control element into its said blocking position, and means, independent of said means for selectively positioning said transmitting member, for moving said control element into said transmitting member released position.

13. Door control mechanism including a latch member supported for movement between a door latched position and a door unlatched position, a detent, an actuating member, a transmitting member, means for selectively positioning said transmitting member in either transmitting or non-transmitting position relative to said detent and said actuating member, a transmitting member control element supported for movement between a transmitting member blocking position and a transmitting member released position, a push button or the like for effecting release of the door control mechanism from door latched position, and operating connections between said push button or the like and said control element whereby movement of said push button into door unlatching position effects concurrent movement of said control element into said transmitting member released position.

EDWIN L. ALLEN.

References Cited in the file of this patent

UNITED STATES PATENTS

| Number | Name | Date |
|---|---|---|
| 1,738,338 | Wells | Dec. 3, 1929 |
| 2,231,075 | Lakin | Feb. 11, 1941 |
| 2,239,326 | Holby | Apr. 22, 1941 |
| 2,249,018 | Marple | July 15, 1941 |
| 2,272,167 | Cloutier | Feb. 10, 1942 |